(12) United States Patent
Hoen et al.

(10) Patent No.: US 7,427,819 B2
(45) Date of Patent: Sep. 23, 2008

(54) FILM-BULK ACOUSTIC WAVE RESONATOR WITH MOTION PLATE AND METHOD

(75) Inventors: Storrs T. Hoen, Brisbane, CA (US); Mark A. Unkrich, Emerald Hills, CA (US); William R. Trutna, Atherton, CA (US); John D. Larson, III, Palo Alto, CA (US); Richard C Ruby, Menlo Park, CA (US); Graham M. Flower, San Jose, CA (US); Annette Grot, Cupertino, CA (US)

(73) Assignee: Avago Wireless IP Pte Ltd, Singapore (SG)

( * ) Notice: Subject to any disclaimer, the term of this patent is extended or adjusted under 35 U.S.C. 154(b) by 363 days.

(21) Appl. No.: 11/073,345

(22) Filed: Mar. 4, 2005

(65) Prior Publication Data

US 2006/0197411 A1   Sep. 7, 2006

(51) Int. Cl.
  *H01L 41/08* (2006.01)
  *G01R 27/04* (2006.01)
(52) U.S. Cl. ............... 310/320; 310/330; 310/331; 310/332; 310/324; 324/633
(58) Field of Classification Search .......... 310/320, 310/330–332, 324, 323.21; 324/633
See application file for complete search history.

(56) References Cited

U.S. PATENT DOCUMENTS

| 3,174,122 A | 3/1965 | Fowler et al. |
| 3,189,851 A | 6/1965 | Fowler |
| 3,321,648 A | 5/1967 | Kolm |
| 3,422,371 A | 1/1969 | Poirier et al. |
| 3,568,108 A | 3/1971 | Poirier et al. |
| 3,582,839 A | 6/1971 | Pim et al. |
| 3,590,287 A | 6/1971 | Berlincourt et al. |
| 3,610,969 A | 10/1971 | Clawson et al. |
| 3,826,931 A | 7/1974 | Hammond |
| 3,845,402 A | 10/1974 | Nupp |
| 4,084,217 A | 4/1978 | Brandis et al. |
| 4,172,277 A | 10/1979 | Pinson |
| 4,272,742 A | 6/1981 | Lewis |

(Continued)

FOREIGN PATENT DOCUMENTS

DE   10160617   6/2003

(Continued)

OTHER PUBLICATIONS

Patent Application in Great Britian No. 0604031.5 Search Report dated Jul. 24, 2006.

(Continued)

*Primary Examiner*—Jaydi A San Martin

(57) ABSTRACT

An apparatus and method for measuring a target environmental variable (TEV) that employs a film-bulk acoustic resonator with motion plate. The film-bulk acoustic resonator (FBAR) includes an acoustic reflector formed in an FBAR wafer and a surface. A first electrode is formed on the surface of the acoustic reflector and has a surface. A piezoelectric layer is formed on the surface of the first electrode and has a surface. A second electrode is formed on the surface of the piezoelectric layer. A motion plate is suspended in space at a predetermined distance relative to the surface of the second electrode and is capacitively coupled to the FBAR.

19 Claims, 8 Drawing Sheets

U.S. PATENT DOCUMENTS

| | | | |
|---|---|---|---|
| 4,281,299 A | 7/1981 | Newbold | |
| 4,320,365 A | 3/1982 | Black et al. | |
| 4,355,408 A | 10/1982 | Scarrott | |
| 4,456,850 A | 6/1984 | Inoue et al. | |
| 4,529,904 A | 7/1985 | Hattersley | |
| 4,625,138 A | 11/1986 | Ballato | |
| 4,640,756 A | 2/1987 | Wang et al. | |
| 4,719,383 A | 1/1988 | Wang et al. | |
| 4,798,990 A | 1/1989 | Henoch | |
| 4,836,882 A | 6/1989 | Ballato | |
| 4,841,429 A | 6/1989 | McClanahan et al. | |
| 4,906,840 A | 3/1990 | Zdeblick et al. | |
| 5,048,036 A | 9/1991 | Scifres et al. | |
| 5,048,038 A | 9/1991 | Brennan et al. | |
| 5,075,641 A * | 12/1991 | Weber et al. | 310/324 |
| 5,118,982 A | 6/1992 | Inoue et al. | |
| 5,129,132 A | 7/1992 | Zdeblick et al. | |
| 5,162,691 A | 11/1992 | Mariani et al. | |
| 5,241,209 A | 8/1993 | Sasaki | |
| 5,241,456 A | 8/1993 | Marcinkiewicz et al. | |
| 5,294,898 A | 3/1994 | Dworsky et al. | |
| 5,382,930 A | 1/1995 | Stokes et al. | |
| 5,384,808 A | 1/1995 | Van Brunt et al. | |
| 5,448,014 A | 9/1995 | Kong et al. | |
| 5,465,725 A | 11/1995 | Seyed-Bolorforosh | |
| 5,587,620 A | 12/1996 | Ruby et al. | |
| 5,589,858 A | 12/1996 | Kadowaki et al. | |
| 5,594,705 A | 1/1997 | Connor et al. | |
| 5,671,242 A | 9/1997 | Takiguchi et al. | |
| 5,692,279 A | 12/1997 | Mang et al. | |
| 5,714,917 A | 2/1998 | Ella | |
| 5,853,601 A | 12/1998 | Krishaswamy et al. | |
| 5,864,261 A | 1/1999 | Weber | |
| 5,872,493 A | 2/1999 | Ella | |
| 5,873,153 A | 2/1999 | Ruby et al. | |
| 5,873,154 A | 2/1999 | Ylilammi et al. | |
| 5,894,647 A | 4/1999 | Lakin | |
| 5,910,756 A | 6/1999 | Ella | |
| 5,932,953 A * | 8/1999 | Drees et al. | 310/324 |
| 5,936,150 A * | 8/1999 | Kobrin et al. | 310/324 |
| 5,953,479 A | 9/1999 | Zhou et al. | |
| 5,982,297 A | 11/1999 | Welle | |
| 6,040,962 A | 3/2000 | Kiyosumi | |
| 6,060,818 A | 5/2000 | Ruby et al. | |
| 6,087,198 A | 7/2000 | Panasik | |
| 6,107,721 A | 8/2000 | Lakin | |
| 6,111,480 A | 8/2000 | Iyama et al. | |
| 6,124,756 A | 9/2000 | Yaklin et al. | |
| 6,150,703 A | 11/2000 | Cushman et al. | |
| 6,187,513 B1 | 2/2001 | Toru | |
| 6,215,375 B1 | 4/2001 | Larson, III et al. | |
| 6,228,675 B1 | 5/2001 | Ruby et al. | |
| 6,229,247 B1 | 5/2001 | Bishop | |
| 6,252,229 B1 | 6/2001 | Hays et al. | |
| 6,262,600 B1 | 7/2001 | Haigh et al. | |
| 6,262,637 B1 | 7/2001 | Bradley et al. | |
| 6,265,246 B1 | 7/2001 | Ruby et al. | |
| 6,278,342 B1 | 8/2001 | Ella | |
| 6,292,336 B1 | 9/2001 | Cheng | |
| 6,307,447 B1 | 10/2001 | Barber et al. | |
| 6,307,761 B1 | 10/2001 | Nakagawa | |
| 6,376,280 B1 | 4/2002 | Ruby et al. | |
| 6,377,137 B1 | 4/2002 | Ruby | |
| 6,384,697 B1 | 5/2002 | Ruby | |
| 6,407,649 B1 | 6/2002 | Tikka et al. | |
| 6,414,569 B1 | 7/2002 | Nakafuku | |
| 6,420,820 B1 | 7/2002 | Larson, III | |
| 6,424,237 B1 | 7/2002 | Ruby et al. | |
| 6,429,511 B2 | 8/2002 | Ruby et al. | |
| 6,434,030 B1 | 8/2002 | Rehm et al. | |
| 6,437,482 B1 | 8/2002 | Akihiko | |
| 6,441,539 B1 | 8/2002 | Kitamura et al. | |
| 6,462,631 B2 | 10/2002 | Bradley et al. | |
| 6,466,105 B1 | 10/2002 | Lobl et al. | |
| 6,466,418 B1 | 10/2002 | Cheng | |
| 6,469,597 B2 | 10/2002 | Ruby et al. | |
| 6,472,954 B1 | 10/2002 | Ruby et al. | |
| 6,476,536 B1 | 11/2002 | Pensala | |
| 6,479,320 B1 | 11/2002 | Gooch | |
| 6,483,229 B2 | 11/2002 | Ylilammi et al. | |
| 6,486,751 B1 | 11/2002 | Barber et al. | |
| 6,489,688 B1 | 12/2002 | Baumann et al. | |
| 6,492,883 B2 | 12/2002 | Liang et al. | |
| 6,507,983 B1 | 1/2003 | Ruby et al. | |
| 6,515,558 B1 | 2/2003 | Ylilammi | |
| 6,518,860 B2 | 2/2003 | Ella et al. | |
| 6,525,996 B1 | 2/2003 | Miyazawa | |
| 6,530,515 B1 | 3/2003 | Glenn et al. | |
| 6,534,900 B2 | 3/2003 | Aigner et al. | |
| 6,542,055 B1 | 4/2003 | Frank et al. | |
| 6,548,942 B1 | 4/2003 | Panasik | |
| 6,550,664 B2 | 4/2003 | Bradley et al. | |
| 6,564,448 B1 | 5/2003 | Oura et al. | |
| 6,566,979 B2 | 5/2003 | Larson et al. | |
| 6,583,374 B2 | 6/2003 | Knieser et al. | |
| 6,583,688 B2 | 6/2003 | Klee et al. | |
| 6,593,870 B2 | 7/2003 | Dummermuth et al. | |
| 6,600,390 B2 | 7/2003 | Frank | |
| 6,601,276 B2 | 8/2003 | Barber | |
| 6,617,249 B2 | 9/2003 | Ruby et al. | |
| 6,617,750 B2 | 9/2003 | Dummermuth et al. | |
| 6,630,753 B2 | 10/2003 | Malik et al. | |
| 6,635,509 B1 | 10/2003 | Ouellet | |
| 6,639,872 B1 | 10/2003 | Rein | |
| 6,651,488 B2 | 11/2003 | Larson et al. | |
| 6,657,363 B1 | 12/2003 | Aigner | |
| 6,668,618 B2 | 12/2003 | Larson et al. | |
| 6,670,866 B2 | 12/2003 | Ella et al. | |
| 6,693,500 B2 | 2/2004 | Yang et al. | |
| 6,710,508 B2 | 3/2004 | Ruby et al. | |
| 6,710,681 B2 | 3/2004 | Figueredo et al. | |
| 6,714,102 B2 | 3/2004 | Ruby et al. | |
| 6,720,844 B1 | 4/2004 | Lakin | |
| 6,720,846 B2 | 4/2004 | Iwashita et al. | |
| 6,724,266 B2 | 4/2004 | Plazza et al. | |
| 6,774,746 B2 | 8/2004 | Whatmore et al. | |
| 6,777,263 B1 | 8/2004 | Gan et al. | |
| 6,787,048 B2 | 9/2004 | Bradley et al. | |
| 6,788,170 B1 | 9/2004 | Kaitila et al. | |
| 6,803,835 B2 | 10/2004 | Frank | |
| 6,812,619 B1 | 11/2004 | Kaitila et al. | |
| 6,828,713 B2 | 12/2004 | Bradley et al. | |
| 6,842,088 B2 | 1/2005 | Yamada et al. | |
| 6,873,065 B2 | 3/2005 | Haigh et al. | |
| 6,873,529 B2 | 3/2005 | Ikuta | |
| 6,874,211 B2 | 4/2005 | Bradley et al. | |
| 6,874,212 B2 | 4/2005 | Larson, III | |
| 6,888,424 B2 | 5/2005 | Takeuchi et al. | |
| 6,900,705 B2 | 5/2005 | Nakamura et al. | |
| 6,903,452 B2 | 6/2005 | Ma et al. | |
| 6,906,451 B2 | 6/2005 | Hajime | |
| 6,911,708 B2 | 6/2005 | Park | |
| 6,917,261 B2 | 7/2005 | Unterberger | |
| 6,924,583 B2 | 8/2005 | Lin et al. | |
| 6,924,717 B2 | 8/2005 | Ginsburg et al. | |
| 6,927,651 B2 | 8/2005 | Larson, III et al. | |
| 6,936,928 B2 | 8/2005 | Hedler et al. | |
| 6,936,954 B2 | 8/2005 | Peczalski | |
| 6,946,928 B2 | 9/2005 | Larson et al. | |
| 6,954,121 B2 | 10/2005 | Bradley et al. | |
| 6,963,257 B2 | 11/2005 | Ella et al. | |
| 6,975,183 B2 | 12/2005 | Aigner et al. | |
| 6,977,563 B2 | 12/2005 | Komuro et al. | |
| 6,985,052 B2 | 1/2006 | Tikka | |

| | | | |
|---|---|---|---|
| 6,987,433 B2 | 1/2006 | Larson, III et al. | |
| 6,989,723 B2 | 1/2006 | Komuro et al. | |
| 6,998,940 B2 | 2/2006 | Metzger | |
| 7,019,604 B2 | 3/2006 | Gotoh et al. | |
| 7,019,605 B2 | 3/2006 | Larson et al. | |
| 7,057,476 B2 | 6/2006 | Hwu | |
| 7,084,553 B2 | 8/2006 | Ludwiczak | |
| 7,091,649 B2 | 8/2006 | Larson | |
| 7,098,758 B2 | 8/2006 | Wang et al. | |
| 7,170,215 B2 | 1/2007 | Namba et al. | |
| 7,173,504 B2 | 2/2007 | Larson | |
| 7,187,254 B2 | 3/2007 | Su et al. | |
| 7,230,509 B2 | 6/2007 | Stoemmer | |
| 2002/0000646 A1 | 1/2002 | Gooch et al. | |
| 2002/0030424 A1 | 3/2002 | Iwata | |
| 2002/0121944 A1 | 9/2002 | Larson, III et al. | |
| 2002/0121945 A1 | 9/2002 | Ruby et al. | |
| 2002/0152803 A1 | 10/2002 | Larson, III et al. | |
| 2002/0190814 A1 | 12/2002 | Yamada et al. | |
| 2003/0001251 A1 | 1/2003 | Cheever et al. | |
| 2003/0006502 A1 | 1/2003 | Karpman | |
| 2003/0051550 A1 | 3/2003 | Nguyen et al. | |
| 2003/0087469 A1 | 5/2003 | Ma | |
| 2003/0102776 A1 | 6/2003 | Takeda et al. | |
| 2003/0111439 A1 | 6/2003 | Fetter et al. | |
| 2003/0128081 A1 | 7/2003 | Ella et al. | |
| 2003/0132493 A1 | 7/2003 | Kang et al. | |
| 2003/0141946 A1 | 7/2003 | Ruby et al. | |
| 2003/0179053 A1 | 9/2003 | Aigner et al. | |
| 2004/0092234 A1 | 5/2004 | Pohjonen | |
| 2004/0124952 A1 | 7/2004 | Tikka | |
| 2004/0150293 A1 | 8/2004 | Unterberger | |
| 2004/0150296 A1 | 8/2004 | Park et al. | |
| 2004/0195937 A1 | 10/2004 | Matsubara et al. | |
| 2004/0257172 A1 | 12/2004 | Schmidhammer et al. | |
| 2004/0263287 A1 | 12/2004 | Ginsburg et al. | |
| 2005/0023931 A1 | 2/2005 | Bouche et al. | |
| 2005/0030126 A1 | 2/2005 | Inoue et al. | |
| 2005/0036604 A1 | 2/2005 | Scott et al. | |
| 2005/0057117 A1 | 3/2005 | Nakatsuka et al. | |
| 2005/0057324 A1 | 3/2005 | Onishi et al. | |
| 2005/0068124 A1 | 3/2005 | Stoemmer | |
| 2005/0093396 A1 | 5/2005 | Larson et al. | |
| 2005/0093653 A1 | 5/2005 | Larson, III | |
| 2005/0093654 A1 | 5/2005 | Larson et al. | |
| 2005/0093655 A1 | 5/2005 | Larson et al. | |
| 2005/0093657 A1 | 5/2005 | Larson et al. | |
| 2005/0093658 A1 | 5/2005 | Larson et al. | |
| 2005/0093659 A1 | 5/2005 | Larson et al. | |
| 2005/0104690 A1 | 5/2005 | Larson | |
| 2005/0110598 A1 | 5/2005 | Larson, III | |
| 2005/0128030 A1 | 6/2005 | Larson et al. | |
| 2005/0140466 A1 | 6/2005 | Larson, III et al. | |
| 2005/0167795 A1 | 8/2005 | Higashi | |
| 2005/0193507 A1 | 9/2005 | Ludwiczak | |
| 2005/0206271 A1 | 9/2005 | Higuchi et al. | |
| 2005/0012570 A1 | 10/2005 | Korden et al. | |
| 2005/0218488 A1 | 10/2005 | Mie | |
| 2006/0087199 A1 | 4/2006 | Larson et al. | |
| 2006/0103492 A1 | 5/2006 | Feng et al. | |
| 2006/0125489 A1* | 6/2006 | Feucht et al. | 324/633 |
| 2006/0132262 A1 | 6/2006 | Fazzlo et al. | |
| 2006/0164183 A1 | 7/2006 | Tikka | |
| 2006/0185139 A1 | 8/2006 | Larson III, et al. | |
| 2007/0084964 A1 | 4/2007 | John et al. | |
| 2007/0085447 A1 | 4/2007 | Larson | |
| 2007/0085631 A1 | 4/2007 | Larson et al. | |
| 2007/0085632 A1 | 4/2007 | Larson et al. | |
| 2007/0086080 A1 | 4/2007 | Larson et al. | |
| 2007/0086274 A1 | 4/2007 | Nishimura et al. | |
| 2007/0090892 A1 | 4/2007 | Larson | |
| 2007/0170815 A1 | 7/2007 | Unkrich | |
| 2007/0171002 A1 | 7/2007 | Unkrich | |

FOREIGN PATENT DOCUMENTS

| | | |
|---|---|---|
| EP | 0865157 | 9/1998 |
| EP | 0880227 | 11/1998 |
| EP | 0973256 | 1/2000 |
| EP | 1047189 | 10/2000 |
| EP | 1100196 | 11/2000 |
| EP | 1096259 | 5/2001 |
| EP | 1100196 | 2/2002 |
| EP | 1258990 | 11/2002 |
| EP | 1180494 | 3/2003 |
| EP | 1542362 | 6/2003 |
| EP | 1258989 | 1/2004 |
| EP | 1249932 | 3/2005 |
| EP | 1517443 | 3/2005 |
| EP | 1517444 | 3/2005 |
| EP | 1528674 | 5/2005 |
| EP | 1528675 | 5/2005 |
| EP | 1528677 | 5/2005 |
| EP | 1557945 | 7/2005 |
| EP | 1575165 | 9/2005 |
| GB | 1207974 | 10/1970 |
| GB | 2411239 | 8/2005 |
| GB | 2418791 | 4/2006 |
| JP | 4063008 | 2/1992 |
| JP | 2002/217676 | 8/2002 |
| WO | WO-98/16957 | 4/1998 |
| WO | WO-01/06647 | 1/2001 |
| WO | WO-01/99276 | 12/2001 |
| WO | WO-02/103900 | 12/2002 |
| WO | WO-03/030358 | 4/2003 |
| WO | WO-03/043188 | 5/2003 |
| WO | WO-03/050950 | 6/2003 |
| WO | WO-2003/058809 | 7/2003 |
| WO | WO-2004/0034579 | 4/2004 |
| WO | WO-2004/051744 | 6/2004 |
| WO | WO-2005/043752 | 5/2005 |
| WO | WO-2005/043753 | 5/2005 |
| WO | WO-2005/043756 | 5/2005 |
| WO | WO-2003/018788 | 2/2006 |

OTHER PUBLICATIONS

U.S. Appl. No. 10/971169, filed Oct. 22, 2004, John D. Larson III, et al.

Holzlohner, Ronald et al., "Accurate Calculation of Eye Diagrams and Bit Erroe Rates in Optical Transmission Systems Using Linearization", *Journal of Lightwave Technology*, vol. 20, No. 3, (Mar. 2002), pp. 389-400.

Reinhardt, Alexandre et al., "Design of Coupled Resonator Filters Using Admittance and Scattering Matrices", *2003 IEEE Ultrasonics Symposium*, (May 3, 2003), 1428-1431.

"Examination report corresponding to application No.", GB0605770.7, (Aug. 25, 2006).

"Examination Report corresponding to application No.", GB0605775.6, (Aug. 30, 2006).

"Search report from corresponding application No.", GB0620152.9, (Nov. 15, 2006).

"Search report from corresponding application No.", GB0620655.1, (Nov. 17, 2006).

"Search report from corresponding application No.", GB0620653.6, (Nov. 17, 2006).

"Search Report from corresponding application No.", GB0620657.7, (Nov. 23, 2006).

Coombs, Clyde F., et al., "Electronic Instrument Handbook", Second Edition, McGraw-Hill, Inc. , (1995), pp. 5.1 to 5.29.

"GB Search Report for", Application No. GB0522393.8, (Jan. 9, 2006), 4 pages.

"GB Search Report for Application No.", GB0525884.3, (Feb. 2, 2006), 4 pgs.

Auld, B. A., "Acoustic Resonators", *Acoustic Fields and Waves in Solids, Second Edition*, vol. 11, (1990), 250-259.

"British Search Report Application No.", 0605222.9, (Jul. 11, 2006).
Tiersten, N.F., et al., "an Analysis of Thiskness-Extensional Trapped Energy Resonant Device Structures with Rectangular Electrodes in the Piezoeletric Thin Film on Silicon Configuration", *J. Appl. Phys.* 54 (10), (Oct. 1983), 5893-5910.
"Search Report from corresponding application", No. GB0605225.2, (Jun. 26, 2006).
"Search Report for Great Britain Patent Application", No. 0617742.2, (Mar. 29, 2007).
"Search Report for Great Britain Patent Application," No. 0617742.2, (Dec. 13, 2006).
"Search Report in the Great Britian Patent Application", *No. 0619698.4*, (Nov. 30, 2006).
Ruby, R. et al., "The Effect of Perimeter Geometry on FBAR Resonator Electrical Performance", *Microwave Symposium Digest, 2005 IEEE MTT-S International*, (Jun. 12, 2005), 217-221.
Schuessler, Hans H., "Ceramic Fliters and Resonators", Reprinted from IEEE Trans. Sonic Ultrason., vol. SU-21, (Oct. 1974), 257-268.
Fattinger, G. G., et al., "Coupled Bulk Acoustic Wave Resonator Filters: Key technology for single-to-balanced RF Filters", 0-7803-8331-1/4/W20.00; IEEE MTT-S Digest, (2004), 927-929.
Choi, Sungjin et al., "Design of Half-Bridge Piezo-Transformer Convertors in the AC Adapter Applications", IEEE 2005, 244-248.
Li, Yunxiu et al., "AC-DC Converter with Worldwide Range Input Voltage by Series and Parallel Piezoelectric Transformer Connection", *35th Annual IEEE Power Electronics Specialists Conference*, (2004).
Ivensky, Gregory et al., "A Comparison of Piezoelectric Transformer AC/DC Converters with Current Doubler and voltage Doubler Rectifiers", *IEEE Transactions on Power Electronics*, vol. 19, No. 6., (Nov. 2004).
Navas, J., et al., "Miniaturised Battery Charger using Piezoelectric Transformers", *IEEE*, (2001), 492-496.
Jiang, Yimin et al., "A Novel Single-Phase Power Factor Correction Scheme", *IEEE*, (1993), 287-292.
Ruby, R.C., "Micro-Machined Thin Film Bulk Acoustic Resonators", *Proc. IEEE 48th, Symposium on Frequency control*, (1994), 135-138.
Larson III, J.D., et al., "Measurement of Effective Kt2q, RpRs vs. Temperature for Mo/AlN/Mo Resonators", *2002 IEEE Ultrasonics Symposium, Munich, Germany*, (Oct. 2002), 915-919.
Aoyama, T. et al., "Diffusion of Boron, Phosphorous, Arsenic and Antimony in Thermally Grown SiliconDioxide", *Fiujitsu Labs, J. Electromechanical Soc.*, vol. 146, No. 5, (1999), 1879-1883.
Parker, T. E., et al., "Temperature-Compensated Surface Acoustic-Wave Devices with SiO2 film Overlays", *J. Appl. Physics*, vol. 50, (1360-1369), Mar. 1979.
Tsubbouchi, K. et al., "Zero Temperature coefficient Surface Acoustic Wave Devices using Epitaxial AlN Films", *IEEE Ultrasonic symposium, San Diaego, CA*, 1082, (1982), 240-245.
Lakin, K. M., "Thin Film Resonators and Filters", *IEEE Untrasonics Symposium, Caesar's Tahoe, NV*, (Oct. 1999), 895-906.
Lakin, K. M., et al., "Temperature Compensated Bulk Acoustic Thin Film Resonators", *IEEE Ultrasonics Symposium, San Juan, Puerto Rico*, (Oct. 2000), 855-858.

Ohta, S. et al., "Temperature Characteristics of Solidly Mounted Piezoelectric Thin Film Resonators", *IEEE Ultrasonics Symposium, Honolulu, HI*, (Oct. 2003), 2011-2015.
Bauer, L. O., et al., "Properties of Silicon Implanted with Boron Ions through Thermal Silicon Dioxide", *Solid State Electronics*, vol. 16, No. 3, (Mar. 1973), 289-300.
Topich, J. A., et al., "Effects of Ion Implanted Flourine in Silicon Dioxide", *Nuclear Instr. And Methods, Cecon Rec, Cleveland, OH*, (May 1978), 70-73.
Spangenberg, B. et al., "Dependence of the Layer Resistance of Boron Implantation in Silicon and the Annealing Conditions", *Comptus Rendus de l'Academic Bulgare des Sciences*, vol. 33, No. 3, (1980), 325-327.
Hara, K. "Surface Treatment of Quartz Oscillator Plate by Ion Implantation", *Oyo Buturi*, vol. 41, No. 2, (Feb. 1978), 145-146.
Ng, J. et al., "The Diffusion Ion-Implanted Boron in Silicon Dioxide", *AIP Conf. Proceedings*, No. 122, (1984), 20-33.
Pang, W., et al., "High Q Single-Mode High-Tone Bulk Acoustic Resonator Integrated With Surface-Machined FBAR Filter", *Microwave Symposium Digest, IEEE MTT-S International*, (2005), 413-416.
Lakin, K.M. "Coupled Resonator Filters", *2002 IEEE Ultrasonics Symposium*, (Mar. 2, 2002), 901-908.
Lakin, K.M. et al., "High Performance Stacked Crystal Filters for GPS and Wide Bandwidth Applications", *2001 IEEE Ultrasonics Symposium*, (Jan. 1, 2001), 833-838.
Krishnaswamy, S.V. et al., "Film Bulk Acoustic Wave Resonator Technology", (May. 29, 1990), 529-536.
Lobl, H.P. et al., "Piezoelectric Materials For BAW Resonators And Filters", *2001 IEEE Ultrasonics Symposium*, (Jan. 1, 2001), 807-811.
Lakin, K.M. "Bulk Acoustic Wave Coupled Resonator Filters", *2002 IEEE International Frequency Control Symposium and PDA Exhibition*, (Jan. 2, 2002), 8-14.
Jung, Jun-Phil et al., "Experimental And Theoretical Investigation On The Relationship Between AlN Properties And AlN-Based FBAR Characteristics", *2003 IEEE International Frequency Control Symposium and PDA Exhibition Jointly with the 17th European Frequency and Time Forum*, (Sep. 3, 2003), 779-784.
Yang, C.M. et al., "Highly C Axis Oriented AlN Film Using MOCVD For 5GHz Band FBAR Filter", *2003 IEEE Ultrasonics Symposium*, (Oct. 5, 2003), pp. 170-173.
Martin, Steven J., et al., "Development Of A low Dielectric Constant Polymer For The Fabrication Of Integrated Circuit Interconnect", *12 Advanced Materials*, (Dec. 23, 2000), 1769-1778.
Hadimioglu, B. et al., "Polymer Films As Acoustic Matching Layers", *1990 IEEE Ultrasonics Symposium Proceedings*, vol. 3 PP., Previously submitted as "Polymer Files As Acoustic Matching Layers, 1990 IEEE Ultrasonics Symposium Proceeding. vol. 4 pp. 1227-1340, Dec. 1990", Considered by Examiner on Mar. 20, 2007, (Dec. 1990), 1337-1340.
"Search Report from corresponding application number", GB 0605779.8, (Aug. 23, 2006).
"Examination Report from UK for application", GB 0605971.1, (Aug. 24, 2006).

* cited by examiner

FILM-BULK ACOUSTIC WAVE RESONATOR
WITH MOTION PLATE AND METHOD

BACKGROUND OF THE INVENTION

Capacitive pressure sensors are well known in the prior art. A typical pressure sensor includes a fixed element with a rigid, planar conductive surface that forms one plate of a substantially parallel plate capacitor. A displaceable (relative to the fixed element) conductive member, such as a metal diaphragm, or a plated non-conductive member, such as a metallized ceramic diaphragm, forms the other plate of the capacitor.

The diaphragm is edge-supported so that a central portion is substantially parallel to and opposite the fixed plate. Because the sensor generally has the form of a parallel plate capacitor, the characteristic capacitance C of the sensor may be approximated by the equation: $C=(\epsilon*A)/d$, where epsilon ($\epsilon$) is the permittivity of the material between the parallel plates, A is the surface area of the parallel plate, and d represents the gap between the plates. It is noted that the characteristic capacitance is inversely proportional to the gap between a central portion of the diaphragm and the conductive surface of the fixed element. In order to permit a pressure differential to develop across the diaphragm, the region on one side of the diaphragm is typically sealed from the region on the opposite side.

The diaphragm elasticity is selected so that pressure differentials across the diaphragm in a particular range of the interest cause displacements of the central portion of the diaphragm. These pressure differential-induced displacements result in corresponding variations in the gap, d, between the two capacitor plates, and thus in capacitance variations produced by the sensor capacitor. For relatively high sensitivity, such sensors require large changes of capacitance in response to relatively small gap changes.

In one prior art approach, the sensor capacitor, which is formed by the fixed conductive surface and the diaphragm, is electrically coupled through conductors to an oscillator circuit. The oscillator circuit typically includes an inductor that forms a tank circuit with the sensor capacitor. This LC tank circuit provides a frequency reference for the oscillator circuit; the output frequency of which is a direct function of the resonant frequency of the tank circuit. The resonant frequency of the tank circuit is in turn a direct function of the inductance L of the inductor and the capacitance C of the sensor capacitor. It is well known to those in the art that the resonant frequency ($\omega_0$) of a simple LC tank circuit is given by $$\omega_0 = \frac{1}{\sqrt{LC}}.$$

As long as the values of the inductor and the capacitor both remain fixed, the output frequency of the oscillator circuit remains constant. However, since the capacitance of the sensor capacitor varies as a function of the pressure applied to the diaphragm, the output frequency of the oscillator circuit also varies as a direct function of the applied pressure. Such a configuration produces a signal whose frequency is indicative of the pressure applied to the remote sensor.

One disadvantage to capacitive pressure sensors with this configuration is the low resonant frequency at which the oscillator circuit operates. Another disadvantage to the capacitive pressure sensors with this configuration is that the manufacture of the sensor capacitor and the oscillator circuit is often complex.

Yet another disadvantage to the prior art capacitive pressure sensors is that the size of the resulting sensor capacitor and the oscillator circuit is often bulky and space inefficient. Consequently, these prior art capacitive pressure sensors may not meet the stringent size and space requirements of portable or other compact applications.

Based on the foregoing, there remains a need for an apparatus and method that detects a target environmental variable (TEV) that overcomes the disadvantages set forth previously.

SUMMARY OF THE INVENTION

According to one embodiment of the present invention, an apparatus and method for measuring a target environmental variable (TEV) that employs a film-bulk acoustic resonator with motion plate is described. The film-bulk acoustic resonator (FBAR) includes an acoustic reflector formed in an FBAR wafer and a surface. A first electrode is formed on the surface of the acoustic reflector and has a surface. A piezoelectric layer is formed on the surface of the first electrode and has a surface. A second electrode is formed on the surface of the piezoelectric layer. A motion plate is suspended in space at a predetermined distance relative to the surface of the second electrode and is capacitively coupled to the FBAR

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

A film-bulk acoustic wave resonator (FBAR) with motion plate is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Target Environment Variable (TEV) Detection Apparatus 100

Figure 1:
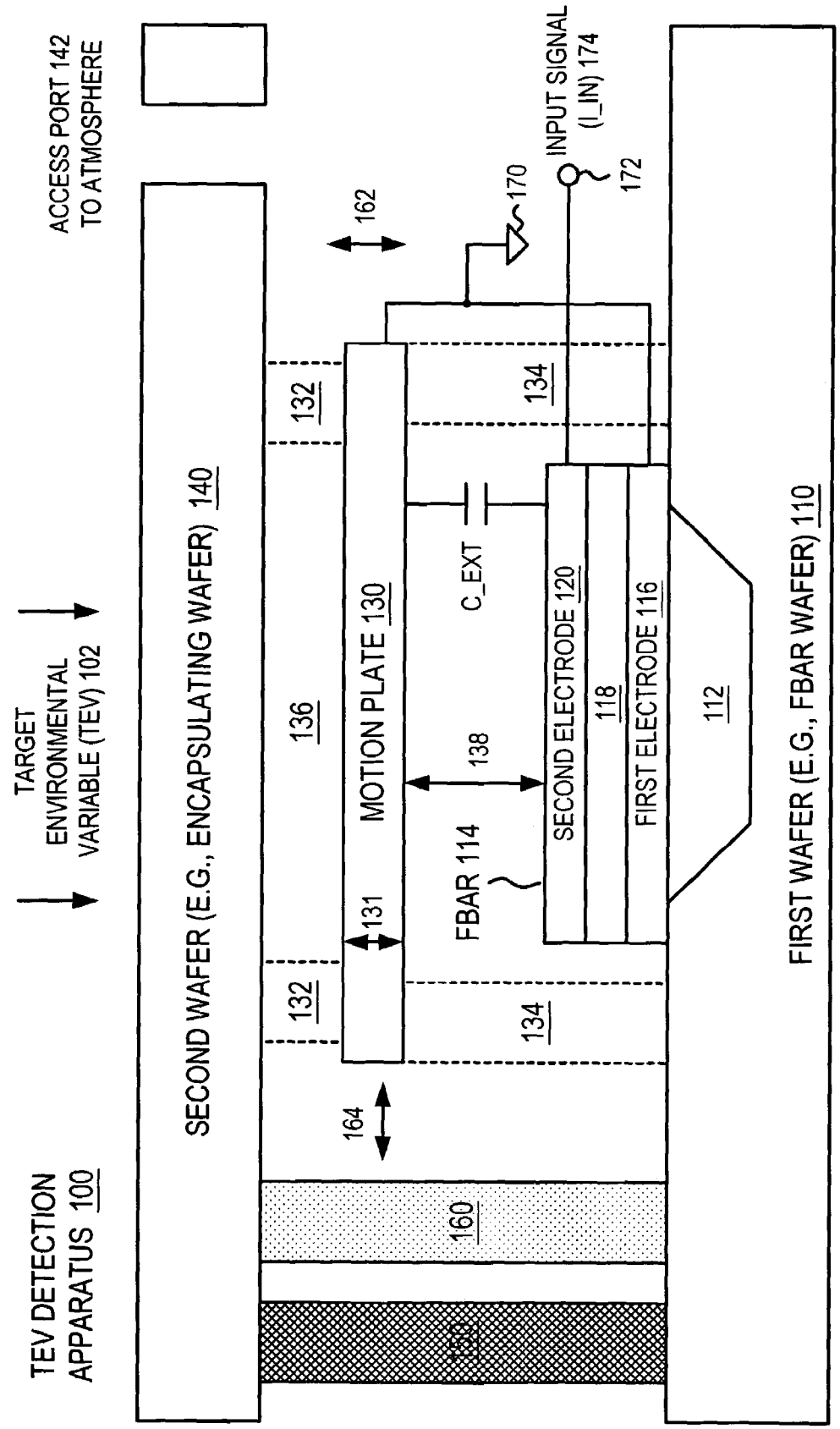
FIG. 1 illustrates a target environment variable (TEV) measuring apparatus 100 that utilizes a FBAR with motion plate according to one embodiment of the invention.

FIG. 1 illustrates a target environment variable (TEV) detection apparatus 100 that utilizes a film-bulk acoustic wave resonator (FBAR) 114 with a motion plate 130 according to one embodiment of the invention. The TEV detection apparatus 100 senses, detects or measures at least one target environmental variable (TEV) 102, which can be, for example, pressure, acceleration, sound, or vibration.

The TEV detection apparatus 100 includes a film-bulk acoustic wave resonator (FBAR) structure 114 (hereinafter also referred to as "FBAR" or "resonator") that is formed on a FBAR wafer 110. The FBAR wafer 110 can be a substrate in which an air gap 112 (also referred to herein as a "swimming pool" or a "cavity") is formed. In one embodiment, the FBAR 114 is formed on the FBAR wafer 110 over the air gap 112.

It is noted that air gap 112 serves to acoustically isolate the FBAR 114 from the underlying FBAR wafer 110. It is further noted that acoustic isolation between the FBAR 114 and the FBAR wafer 110 may be achieved by utilizing other techniques. For example, instead of disposing the FBAR 114 over a cavity or air gap 112 as shown in FIG. 1, acoustic isolation between the FBAR 114 and the FBAR wafer 110 may be achieved by fabricating an acoustic reflector (e.g., a Bragg acoustic reflector) underneath the FBAR 114. For example, the acoustic reflector can include layers of solid, rigid material. In one embodiment, the acoustic Bragg reflector is implemented with alternating layers of high acoustic velocity layers and low acoustic velocity layers. In one embodiment, the acoustic Bragg reflectors include six pairs of alternating high acoustic velocity layers and low acoustic velocity layers.

The FBAR resonator 114 includes a first electrode 116 (referred to herein also as a "bottom electrode"), a piezoelectric layer 118, and a second electrode 120 (referred to herein also as a "top electrode").

The FBAR 114 is formed on an FBAR wafer 110 by using manufacturing processes that are known by those of ordinary skill in the art. For example, U.S. Pat. No. 6,060,818 to Ruby et al. (2000), entitled "SBAR structures and method of fabrication of SBAR/FBAR film processing techniques for the manufacturing of SBAR/FBAR filters," and U.S. Pat. No. 5,873,153 to Ruby et al. (2000), entitled "Method of making tunable thin film acoustic resonators," describe exemplary methods of fabricating or manufacturing FBARs.

In general, each FBAR includes two conductor layers (e.g., two metal layers) that sandwich a piezoelectric (PZ) layer that can be manufactured from, for example, aluminum nitride (AlN).

The TEV detection apparatus 100 also includes a motion plate 130 (also referred to herein as a "motional plate"). In one embodiment the motion plate is disposed or positioned in relation to the FBAR 114 so as to cause a capacitive coupling between the FBAR 114 and the motion plate 130. For example, the motion plate 130 may be suspended above the FBAR 114 in a plane that is substantially parallel to the plane of the FBAR 114.

In one embodiment, the motion plate 130 may be suspended above the FBAR 114 by utilizing one or more first supports 134 that are anchored to or coupled to the FBAR wafer 110. Alternatively, the motion plate 130 may be suspended above the FBAR 114 by utilizing one or more second supports 132 that are anchored to or coupled to a second wafer 140. It is noted that a combination of a support from the first wafer 110 and a support from the second wafer 140 may be used to suspend the motion plate 130. Stated differently, the motion plate 130 may be coupled to or attached to only the first wafer 110, only the second wafer 140, or both the first wafer 110 and the second wafer 140.

It is noted that the motion plate 130 may be manufactured from materials that include, but are not limited to, a conductive silicon material, polysilicon, molybdenum, gold, aluminum, and other conductive materials that are known to those of ordinary skill in the semiconductor fabrication and manufacturing art.

For example, the motion plate 130 may be fabricated from the same types of materials suitable for the electrodes 116, 120. The supports 132, 134 may be manufactured from materials that include, but are not limited to, silicon dioxide, silicon nitride, tungsten, conductive material, or other materials that are known to those of ordinary skill in the semiconductor fabrication and manufacturing art.

In one embodiment, the motion plate 130 and the supports 132, 134 are made from the different materials. For example, the supports 132, 134 for the motion plate 130 may be made from a more substantially rigid material as compared to the material utilized for the motion plate 130. In another embodiment, the motion plate 130 and the supports 132, 134 are made from the same material. In this case, portions of the motion plate 130 may be removed or excised to form a thinner area or flexible portion that allows the motion plate 130 to flex or bend with respect to the supports.

The thickness 131 of the motion plate 130 can be in the range of about 0.1 microns to about 100 microns, and the distance 138 between the motion plate 130 and the second electrode 120 can be in the range of about 0.1 microns to about 5 microns. It is noted that the material utilized to fabricate the motion plate 130 and the supports 132, 134 may be the same or different.

It is further noted that the motion plate 130 can be disposed over the FBAR 114 as shown (e.g., a complete overlap), disposed so that a portion of the motion plate 130 overlaps the FBAR 114, or disposed in such a manner that there is no overlap of the motion plate 130 and the FBAR 114. For example, the FBAR and motion plate can be configured so that there is a partial overlap between the motion plate 130 and the FBAR 114 as long as a capacitive coupling or electrical coupling between the motion plate 130 and FBAR 114 exists.

When there is no overlap of the motion plate 130 and the FBAR 114, and a capacitive coupling between the motion plate 130 and the FBAR 114 cannot be achieved due to the distance there between, the motion plate can be disposed in relation to a conductive area (e.g., a conductive pad) that represents the signal of the top electrode of the FBAR. For example, the motion plate 130 can be disposed in relation to a conductive pad that is electrically coupled to the top surface of the top electrode. In this manner, the capacitance or capacitive coupling between the motion plate and the FBAR can be maintained even though the FBAR and motion plate are physically set apart from each other.

The FBAR 114 has a resonance frequency. The capacitance (e.g., C_EXT) between the motion plate 130 and the FBAR 114 causes the resonance frequency to change or shift from an initial value (e.g., a value before the motion plate is displaced). When the motion plate 130 is displaced, the capacitance (e.g., C_EXT) between the motion plate 130 and the FBAR 114 changes, thereby causing the resonance frequency of the FBAR resonator 114 to change or vary. The physical displacement or movement of the motion plate 130 can be along an axis (e.g., an x-axis 164) substantially in the plane of the motion plate 130, along an axis (e.g., an z-axis 162) that is in a plane that is substantially perpendicular or substantially normal to the plane of the motion plate 130, or rotating about an axis (e.g., an x-axis 164) for gyroscope applications. For example, the movement of the motion plate shown in FIG. 3, which is described in greater detail hereinafter, is along an axis (e.g., axis 164 in FIG. 1 and axis 302 in FIG. 3) substantially in the plane of the motion plate 130. The movement of the motion plates shown in FIGS. 4 & 5, which are described in greater detail hereinafter, is along an axis that is in a plane that is substantially perpendicular or substantially normal to the plane of the motion plate 130 (e.g. along axis 162 in FIG. 1).

Continuing with FIG. 1, it is noted that when driving the FBAR 114, the drive power applied to drive the FBAR 114 should be low enough so that the motion plate 130 is not displaced from the electrostatic attraction between the FBAR 114 and the motion plate 130.

The motion plate 130 can be, for example, a proof mass or suspended mass. The proof mass, for example, may be capacitively coupled to the FBAR 114 and through the capacitive coupling alters or changes the resonant properties of the resonator 114. These resonant properties can include, but is not limited to, resonant frequency or a quality factor (Q) of the resonator 114. It is noted that the motion plate 130 (e.g., suspended mass) may be disposed underneath the FBAR 114 or above the FBAR 114.

In one embodiment, the apparatus 100 includes a second wafer 140 (also referred to herein as an "encapsulating wafer," "capping wafer" or "microcap") that is employed to encapsulate the FBAR 114 after the FBAR resonator 114 has been fabricated. A bonding material 150, such as Au, may be employed to bond the FBAR wafer 110 and the encapsulating wafer 140. One or more spacers 160 may also be employed to maintain a fixed separation distance between the FBAR wafer 110 and the encapsulating wafer 140. Fabrication and use of the encapsulating wafer (also known as a microcap) is known by those of ordinary skill in the art. For example, U.S. Pat. No. 6,265,246 to Ruby et al. (2001), entitled "Microcap wafer-level package," U.S. Pat. No. 6,228,675 to Ruby et al. (2002), also entitled "Microcap wafer-level package," and U.S. Pat. No. 6,376,280 to Ruby et al. (2001), entitled "Microcap wafer-level package with vias," describe exemplary methods of fabricating the microcap wafer-level package.

In the embodiment shown in FIG. 1, the motion plate 130 is suspended from a second wafer 140 (also referred to herein as an "encapsulating wafer," "capping wafer" or "microcap") that is employed to encapsulate the FBAR 114 after the FBAR resonator 114 has been fabricated.

Figure 10:
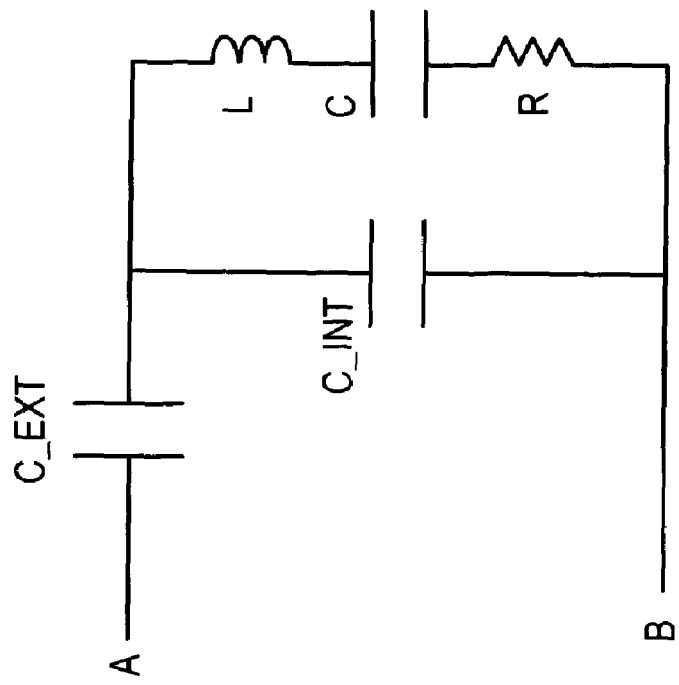
FIG. 10 illustrates a second circuit representation of a FBAR with a motion plate according to another embodiment of the invention.
Figure 9:
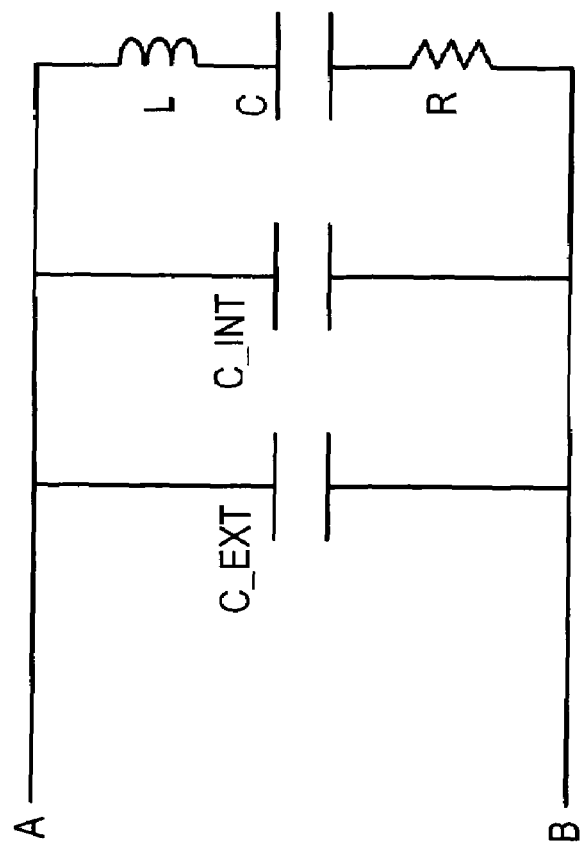
FIG. 9 illustrates a first circuit representation of a FBAR with a motion plate according to one embodiment of the invention.

In one embodiment, the bottom electrode 116 and the motion plate 130 are coupled to a first potential 170 (e.g., a ground potential). The top electrode 120 is coupled to an electrode (e.g., a conductive pad) 172 to receive an input signal 174 (e.g., I_in). FIG. 9 illustrates a first circuit representation of a FBAR with a motion plate with these electrical connections. In an alternative embodiment, the bottom electrode 116 is coupled the first potential (e.g., a ground potential), and the top electrode 120 is left floating. The motion plate 130 is coupled to an electrode (e.g., a conductive pad) to receive an input signal (e.g., I_in). FIG. 10 illustrates a second circuit representation of a FBAR with a motion plate with these electrical connections.

In this embodiment, the motion plate 130 may be manufactured separately from the FBAR 114. In this manner, the motion plate may be designed and manufactured to provide displacements that are tailored to detect expected changes a target environmental variables (TEV) (e.g., accelerations, pressures and vibrations).

In an alternative embodiment, the encapsulating wafer is manufactured, fabricated, or configured to include a support portion, a flexible portion, and a motion plate portion. A separate motion plate is not needed in this embodiment, since a portion of the encapsulating wafer (i.e., the motion plate portion) acts as a motion plate. For example, a portion of the encapsulating wafer that acts as the motion plate is referred to herein as a motion plate portion. For example, the motion plate portion of the encapsulating wafer can deform or move with respect to the FBAR.

The flexible portion of the encapsulating wafer acts as a flexure (hereinafter also referred to as a flexure portion) that is flexible to allow the motion plate portion to move with respect to the support portion of the encapsulating wafer. The thickness of a motion plate portion of the encapsulating wafer that acts as a motion plate can be in the range of about 0.1 microns to about 100 microns. One or more of the techniques that are described in greater detail hereinafter with reference to FIG. 5 (pressure sensing application) may be employed to fabricate the support portion, flexure portion, and motion plate portion of the encapsulating wafer and to make the motion plate portion of the microcap wafer act as a motion plate.

In the embodiment shown in FIG. 1, a cavity or space 136 created by the motion plate 130 and the microcap wafer 140 is sealed so that a first surface of the motion plate 130 that faces the second wafer 140 is not subject to changes in an external TEV (e.g., pressure). However, an opening 142 (e.g., an access port) is made in the second wafer 140 that exposes the FBAR 114 and a second surface of the motion plate 130 that faces the FBAR 114 to atmosphere. Consequently, the motion plate 130 moves along the axis 162 as the second surface of the motion plate 130 is subjected to the TEV while the first surface of the motion plate 130 is insulated from the TEV. In this manner, changes in the external TEV (e.g., pressure) cause the resonant frequency of the FBAR 114 to change.

In an alternative embodiment, the cavity 136 behind the motion plate 130 is opened, and the remaining FBAR structure is sealed to ensure that the first surface and the second surface of the motion plate 130 are not both exposed to the same environmental conditions or variables (e.g., atmosphere). For example, an opening (not shown) may be made in the second wafer 140 above the motion plate 130 so that the cavity 136 is not sealed, but exposed to atmosphere, and the remaining portions of the second wafer 140 are sealed from the atmosphere (i.e., port 142 is closed). When the two sides of the motion plate are exposed to different atmospheric conditions or environmental variables (e.g., when one side is sealed from the environment, and the other side is exposed to the environment), the motion plate 130 can be utilized to sense changes in the TEV.

It is noted that shape or geometry of the motion plate 130 may be substantially the same as the shape or geometry of the FBAR 114. For example, in one embodiment, the geometry of the motion plate 130 and the geometry FBAR 114 are both substantially in the shape of a pentagon. However, it is noted that the motion plate 130 and the FBAR 114 are not limited to this geometry, but instead may have other geometries or shapes. Also, the shape or geometry of the motion plate 130 may be different from the shape or geometry of the FBAR 114.

As described in greater detail hereinafter with reference to FIGS. 3-5, the FBAR with motion plate can be employed to sense or detect different target environmental variables (TEVs) for corresponding applications (e.g., pressure sensor, microphone, accelerometer, or vibrometer). Since the FBAR resonator is a very high Q resonator, the fundamental phase noise of the resonator's resonant frequency is very low. The low fundamental phase noise allows a TEV detection apparatus that employs the FBAR with motion plate according to the invention to detect very small changes in resonant frequency. Consequently, the motion plate responds well to changes in a target environmental variable (TEV) (e.g., pressure, acceleration or other environmental factors). In one embodiment, the resonant frequency of the FBAR is changed or varied by the positional displacement of the motion plate since there is a capacitive coupling between the motion plate and the FBAR resonator.

TEV Measuring Apparatus that Employs a Pair of FBARs

Figure 2:
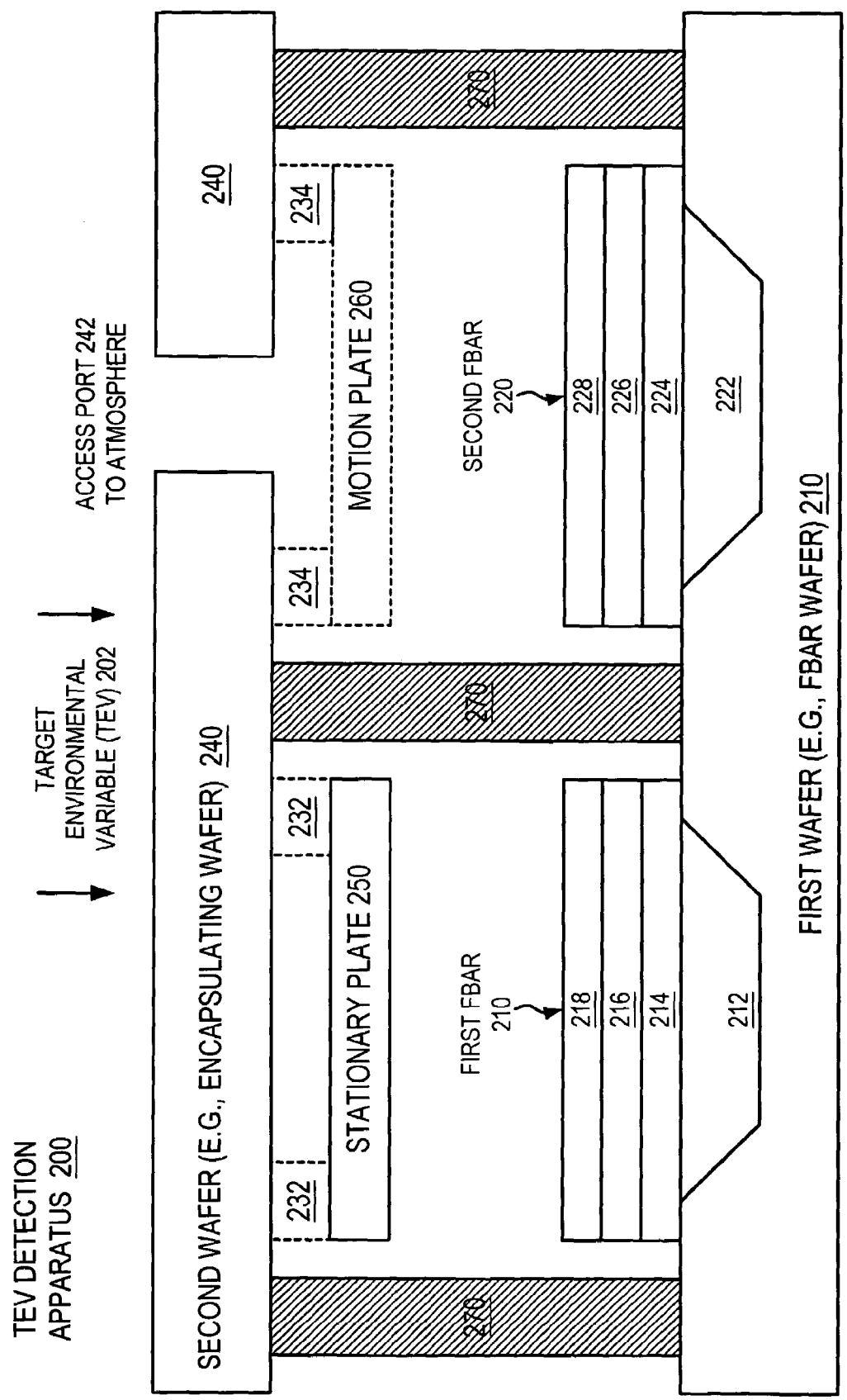
FIG. 2 illustrates a target environment variable (TEV) measuring apparatus 100 that utilizes a first FBAR with an associated stationary plate and a second FBAR with a motion plate according to another embodiment of the invention.

FIG. 2 illustrates a target environment variable (TEV) measuring apparatus 200 that utilizes a first FBAR 210 with an associated stationary plate 250 and a second FBAR 220 with a motion plate 260 according to another embodiment of the invention. In this embodiment, a first FBAR 210 and a second FBAR 220 are fabricated in a side-by-side configuration over a respective air gap 212, 222 in the first wafer 210.

According to another embodiment of the invention, a second FBAR may be utilized with any plate corresponding thereto. The second FBAR acts as a control or reference that can be utilized to account for factors not related to the target environmental variable (e.g., non-target environmental variables).

Moreover, it is noted that that stationary plate 250 is not limited to a "non-moving" plate, but instead can be a control plate or reference plate that may move as long as the motion plate moves in at least one more direction than the control plate plate so that movement in the extra direction can be utilized to detect a TEV.

The first FBAR 210 includes two conductor layers (e.g., first conductive layer 214 and second conductive layer 218) that sandwich a piezoelectric (PZ) layer 216 that can be manufactured from a piezoelectric material, such as aluminum nitride (AlN). Similarly, the second FBAR 220 includes two conductor layers (e.g., first conductive layer 224 and second conductive layer 228) that sandwich a piezoelectric (PZ) layer 226 that can be manufactured from a piezoelectric material, such as aluminum nitride (AlN). The first electrode 214, 224 is referred to herein also as the "bottom electrode," and the second electrode 218, 228 is referred to herein also as "top electrode." Bonding material 270 is utilized to couple the first wafer 210 ("FBAR wafer") to the second wafer 240 ("encapsulating wafer").

The stationary plate 250 is shown as being coupled to or attached to only the second wafer 240 by one or more supports 232. Similarly, the motion plate 260 is shown as being coupled to or attached to only the second wafer 240 by one or more supports 234. It is noted that the stationary plate 250 and the motion plate 260 may also be coupled to, attached to, or supported by only the first wafer 210 through other supports (not shown) or by a combination of both the first wafer 210 and the second wafer 220 through respective supports.

One manner in which to detect or sense a target environmental variable (TEV) with one of the FBARs while not sensing the TEV by the other FBAR is to expose one of the FBARs to the TEV while insulating the other FBAR from the TEV. For example, an opening 242 (e.g., an access port) may be made in the second wafer 240 to allow a TEV to displace or affect the motion plate 260 while the second wafer disposed above the stationary plate 250 does not have any openings in order to insulate or prevent the TEV from displacing or affecting the stationary plate 250. Alternatively, if both FBARs are exposed to the TEV, differences in the construction, design, or both, in the stationary plate 250 versus the motion plate 260 can also achieve the goal of sensitizing one of the FBARs to the TEV. For example, more rigid supports may be utilized for the stationary plate 150 than the motion plate 260, or the stationary plate 150 may be made heavier than the motion plate 160.

By utilizing a first FBAR 210 with a fixed or non-moving motion plate 250 disposed in relation thereto and a second FBAR 220 with a motion plate 260 disposed in relation thereto, unwanted signals (e.g., noise, unwanted effects due to different operating temperatures, drift, and other signals not relevant to the measurement of the target environmental variable (TEV)) are differentially canceled, thereby leaving an output signal that more accurately represents the TEV to be detected or sensed.

Specifically, according to one embodiment of the invention, a first FBAR 210 with an associated stationary plate (e.g., a plate 250 corresponding to the first FBAR 210 that is not free to move) and a second FBAR 220 with an associated motion plate 260 (e.g., a plate corresponding to the second FBAR 220 that is free to move) are provided. The first FBAR 210 has a first resonant frequency, and the second FBAR 220 has a second resonant frequency. The motion or displacement of the motion plate 260 can be detected or measured by observing the beat frequency of the two oscillators (e.g., the first FBAR 210 and second FBAR 220). For example, a first signal at the resonant frequency of the first FBAR 210 may be mixed with a second signal at the resonant frequency of the second FBAR 220 to detect displacement of the motion plate 260. In this manner, a very small change in the resonant frequency of the second FBAR 220 may be detected.

One advantage of this embodiment over an embodiment that only includes a single FBAR and motion plate is that the two FBARs drift similarly with temperature so that any changes of the resonant frequency of the FBARs due to changes in the temperature are canceled out in a differential fashion when the two signals from the two FBARs are mixed together.

Pressure Sensing Applications

In one embodiment, the FBAR with motion plate can be utilized to measure changes in pressure. In this embodiment, an access port is provided in the FBAR to allow sensing of external conditions or factors (e.g., changes in pressure in the surrounding environment). As described in greater detail hereinafter with reference to FIG. 5, an FBAR with motion plate can be utilized to detect or sense the deformity of the motion plate caused by changes in pressure of the environment.

Accelerometer Applications

In one embodiment, the FBAR with motion plate can be utilized to implement an accelerometer that senses acceleration. In one embodiment, an access port is not provided in the FBAR. As described in greater detail hereinafter, acceleration in two different directions may be measured by utilizing a corresponding embodiment of the invention. Examples of different types of accelerometers, in which the TEV detection apparatus according to the invention can be implemented, include, but are not limited to, low-g accelerometers, high-g accelerometers, single axis accelerometers, dual axis accelerometers, etc. These accelerometers are used to measure shock, vibration, tilt, position and motion in a wide variety of different applications, such as sensor applications, automotive applications (e.g., vehicle security and front and side airbag systems), sports-related devices, medical devices, laptop hard drive protection systems, and correction in digital projectors.

Figure 3:
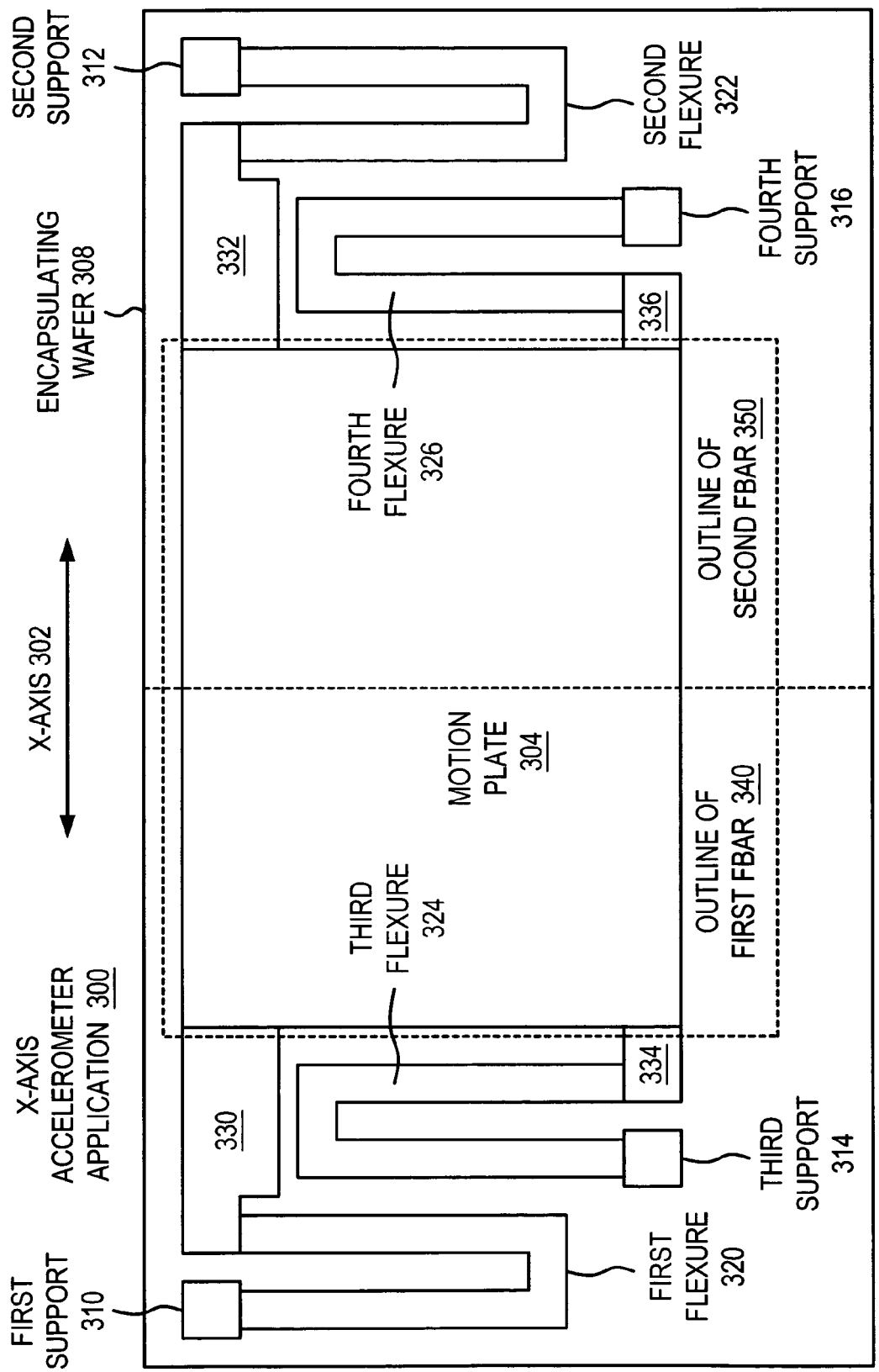
FIG. 3 illustrates a bottom view of a motion plate for an accelerometer application that detects acceleration along a first axis according to a one embodiment of the invention.

FIG. 3 illustrates an FBAR with motion plate that can be employed to sense or detect acceleration along a first axis (e.g., an x-axis). FIG. 4 illustrates an FBAR with motion plate that can be employed to sense or detect acceleration along a second axis (e.g., a z-axis). In one embodiment, the motion plate utilized in the accelerometer application is heavier than the motion plate utilized in the pressure sensing application that is described in greater detail hereinafter.

Exemplary Motion Plate Embodiment for X Axis Accelerometer Application

FIG. 3 illustrates a bottom view of a motion plate 304 for an x-axis accelerometer application 300 that detects acceleration along a first axis 302 (e.g., along the x-axis) according to a one embodiment of the invention. In this embodiment, the motion plate 304 is supported in such a manner as to allow movement or displacement along the first axis 302 (e.g., the X axis). For example, the first axis 302 may be in a plane that is substantially parallel to the plane of the FBAR wafer or encapsulating wafer.

In this embodiment, the motion plate 304 is coupled to or attached to a bottom surface of the encapsulating wafer 308. The motion plate 304 includes connection portions (e.g., 330, 332, 334 and 336) that couple directly or indirectly to a corresponding support. The application 300 includes one or more supports (e.g., a first support 310, a second support 312, a third support 314, and a fourth support 316). The support may be coupled to or anchored in either the encapsulating wafer as shown or in the FBAR wafer. For example, the connection portions of the motion plate 304 can be attached directly to a support or indirectly attached to a support through a flexure.

In this embodiment, the application 300 includes one or more flexures (e.g., a first flexure 320, a second flexure 322, a third flexure 324, and a fourth flexure 326) that connect the motion plate 304 to a respective support (e.g., supports 310, 312, 314, 316). Each flexure includes a first end portion that is coupled to a connection portion of the motion plate 304 and a second end portion that is coupled to the encapsulating wafer 308. It is noted that the motion plate 304 can also be suspended or supported by the FBAR wafer (e.g., by utilizing supports that are coupled to the FBAR wafer).

The flexures allow the motion plate 304 to move substantially along the X-axis 302 (e.g., excursions substantially parallel to the plane of the FBAR wafer or the encapsulating wafer). The flexure can be a substantially straight beam, a curved beam, a beam with one or more bending portions, or other beam with other shapes and configurations. In one embodiment, the flexures are bending beam flexures that allow the motion plate 304 to move substantially parallel to the plane of the FBAR wafer or the encapsulating wafer.

In one embodiment, the supports (310, 320, 330, and 340) are rigid supports that are disposed between the encapsulating wafer and the flexures or the FBAR wafer and the flexures. It is noted that the number of supports and the number of flexures may be more or less than the number shown and may be adjusted or varied to suit the requirements of a particular application.

In this embodiment, it is noted that the motion plate 304 is positioned with respect to the first and second FBARs so that the motion plate 304 is positioned over the pair of FBARs with an equal overlap until the motion plate 304 moves. It is further noted that the material that is utilized to bond the FBAR wafer and the encapsulating wafer and the spacers between the FBAR wafer and the encapsulating wafer are not shown in this figure.

Exemplary Motion Plate Embodiment for Z Axis Accelerometer Application

Figure 4:
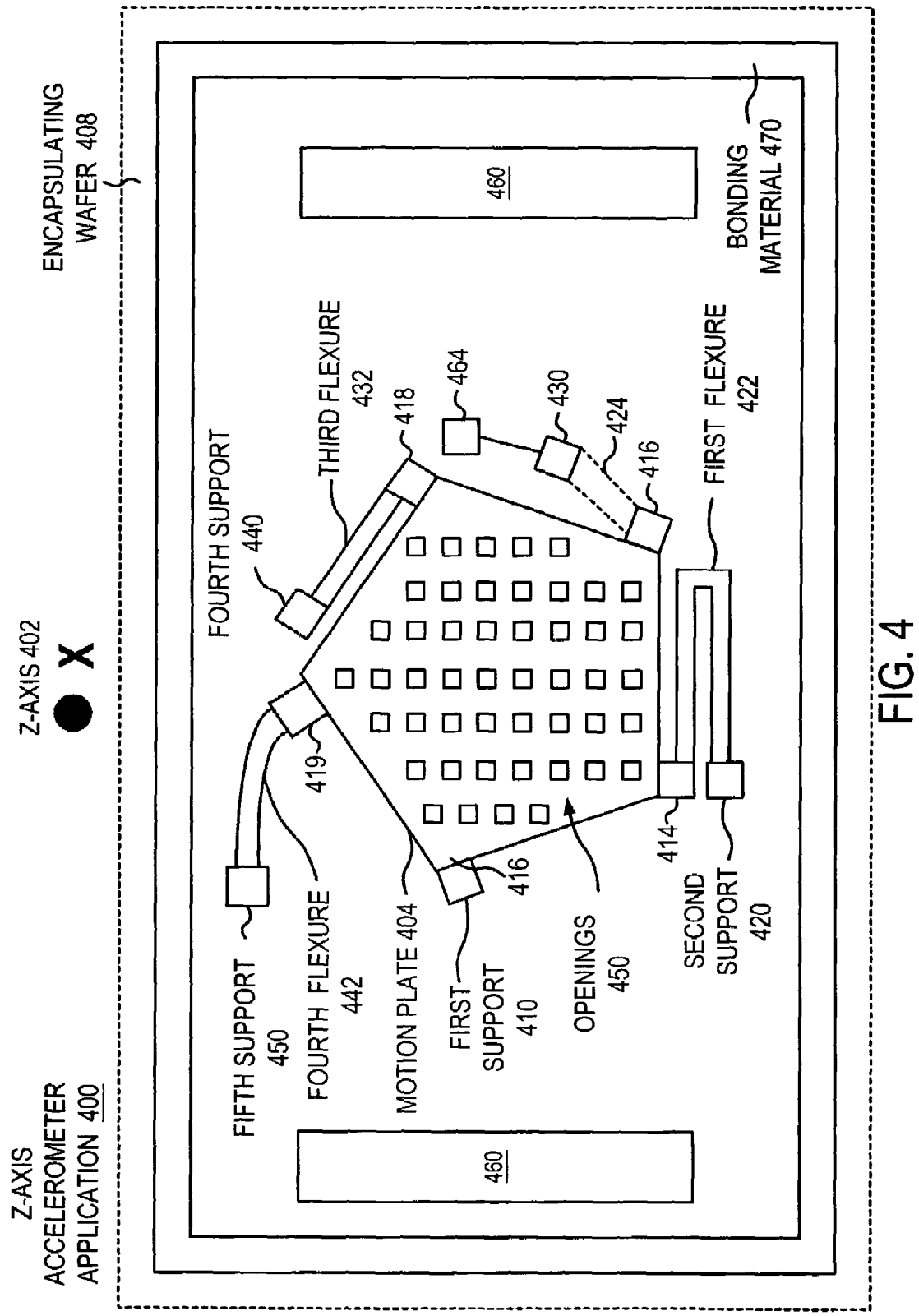
FIG. 4 illustrates a bottom view of a motion plate for an accelerometer application that detects acceleration along in a second axis according to a one embodiment of the invention.

FIG. 4 illustrates a bottom view of a motion plate for a z-axis accelerometer application 400 that detects acceleration along a second axis 402 according to a one embodiment of the invention. In this embodiment, the motion plate 404 is supported in such a manner as to allow movement or displacement along a second axis 402 (e.g., the Z axis). For example, the second axis 402 may be generally normal or perpendicular to the plane of the FBAR wafer or encapsulating wafer (e.g., into the page and out of the page).

The Z-axis accelerometer application 400 senses or detects acceleration along the Z axis 402. The motion plate 404 includes a plurality of connections portions (e.g., a first connection portion 416, a second connection portion 414, a third connection portion 416, a fourth connection portion 418, and a fifth connection portion 419). One or more supports are provided to support or suspend the motion plate 404. In one embodiment, the connection portions are coupled to a respective support (e.g., a first support 410, a second support 420, a third support 430, a fourth support 440, and a fifth support 450). The connection portions can be integrally formed with the motion plate 404 or can be separate pieces that are coupled to or attached to the motion plate 404.

One or more flexures may also be employed to connect or couple the support to the motion plate. Each flexure includes a first end that couples to or attaches to a support and a second end that coupled to or attaches to a connection portion of the motion plate. There are a variety of different types of flexures that can be employed to connect or couple a connection portion of the motion plate to a respective support. In one case, the first support 410 is directed coupled to the first connection portion 416 of the motion plate 404 without any flexure. In another example, the second support 420 is coupled to the second connection portion 414 through the use of a first type of flexure 422, which is a beam with a bending portion. In yet another example, the third support 430 is coupled to the third connection portion 416 through the use of another type of flexure 424, which can be one of a variety of geometric shapes or a combination thereof. In another example, the fourth support 440 is coupled to the fourth connection portion 418 through the use of a fourth type of flexure 432, which is a substantially straight beam without any bending portions. In another example, the fifth support 450 is coupled to the fifth connection portion 419 through the use of a fifth type of flexure 422, which is an arc-shaped beam with an arc portion. It is noted that a single type of flexures may be employed for all the connections to the supports, or a combination of the different types of flexures may be utilized to connect to the respective supports.

In one embodiment, one or more openings or holes 450 may be provided in the motion plate 404 to mitigate the effects of squeeze film damping. The application 400 can include a signal pad 464 that provides a signal (e.g., an input signal, or a power signal) to the motion plate 404. Spacers 460 and the bonding material 470 utilized to bond the FBAR wafer to the encapsulating wafer are also shown. It is noted that multiple spacers 460 may be utilized, and there may be multiple rectangular tracks of bonding material.

Exemplary Motion Plate Embodiment for Pressure Measuring Application

Figure 5:
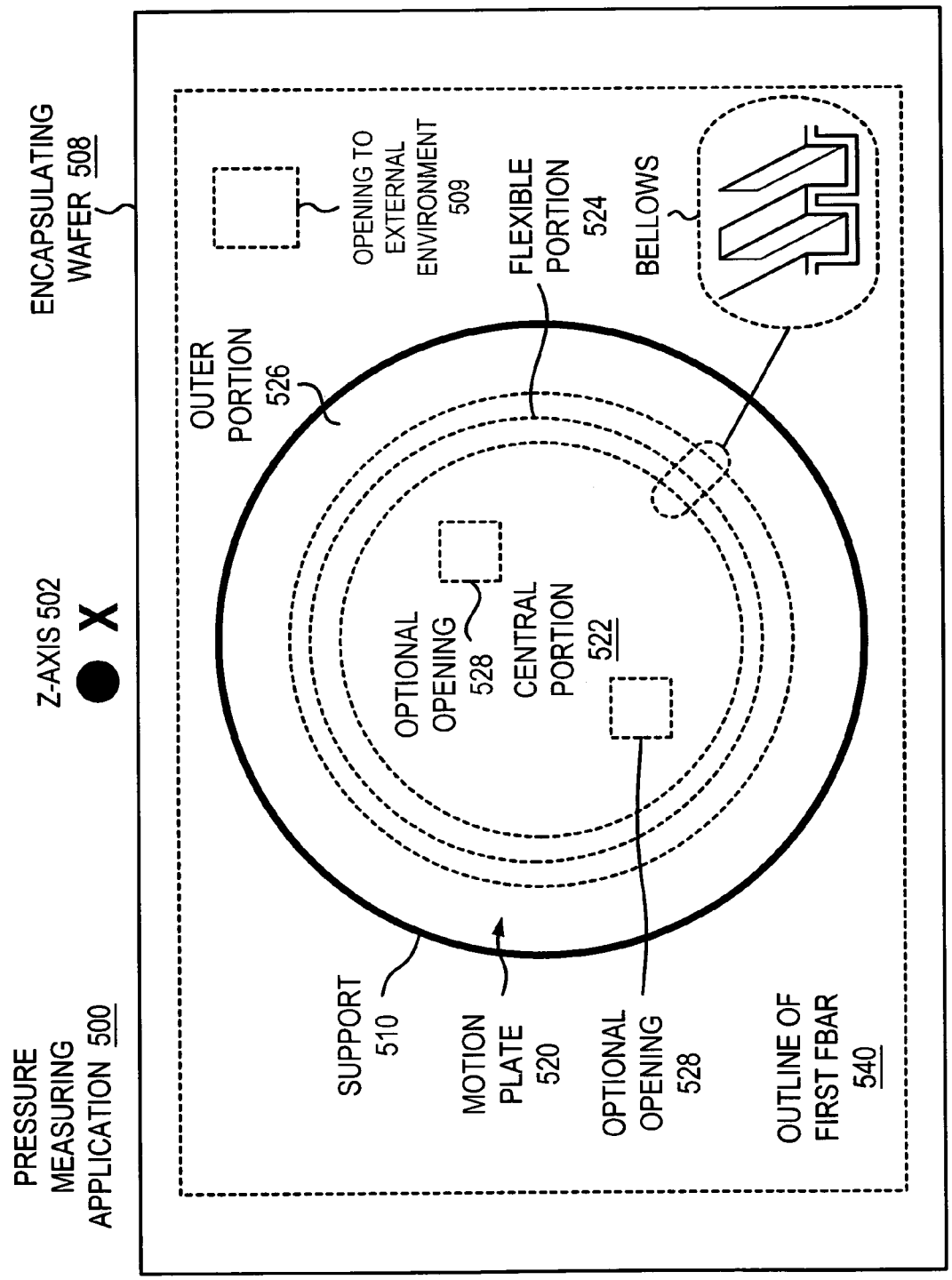
FIG. 5 illustrates a bottom view of a motion plate and support for a pressure sensing application according to a one embodiment of the invention.

FIG. 5 illustrates a bottom view of a motion plate 520 for a pressure sensing application 500 according to a one embodiment of the invention. The motion plate 520 acts as a membrane that moves in response to pressure changes in the environment.

The motion plate 520 includes a center portion 522, a flexible portion 524, and an outer portion 526 that is coupled to a support 510. In this embodiment, the support 510 may be implemented by a substantially rigid support 510 that is disposed between the encapsulating wafer 508 and the motion plate 520.

The flexible portion 524 can include bellows 530 that allow the center portion 522 to be moved or displaced along in the Z-axis 502 that is generally normal or perpendicular to the plane of the encapsulating wafer 508 (e.g., into the page or out of the page). Alternatively, the center portion 522 may be manufactured with a thickness that is less than the thickness of the outer portion 526 or the center portion 522. By manufacturing the motion plate 520 with a thinned flexible portion 524, the center portion 522 may be moved or displaced more easily along the Z-axis 502 than when the motion plate 520 has a uniform thickness throughout the different regions (522, 524, 526).

A combination of these methods or other techniques may be employed to allow or enable the center portion 522 of the motion plate 520 to be moved or displaced along the z-axis 502.

In this embodiment, the motion plate 520 has a generally circular geometry. However, it is noted that other geometries may be utilized for the motion plate 520.

For example, when the motion plate 520 is designed to move or be displaced in response to a target environmental variable (TEV), one or more openings 509 (e.g., vents) may be created in the encapsulating wafer 508 to expose the motion plate 520 to the external environment and more specifically to the target environmental variable being detected. It is noted that optional openings 528 may be formed in the encapsulating wafer 508 in a region directly above the motion plate 520 or in a region that is not bounded by an outline or projection of the perimeter of the motion plate 520 onto the encapsulating wafer 508. It is further noted that the number of openings and the geometry of such openings may be varied to suit the requirements of a particular application.

When configuring a stationary plate, a structure similar to FIG. 5 may be utilized. In one embodiment, the flexible portion 524 is replaced with a substantially rigid portion that substantially limits the movement or displacement of the center portion 522 along the Z-axis 502. In an alternative embodiment, the flexible portion 522 is not thinned (i.e., the plate has substantially the same thickness throughout the different regions). In another embodiment, the openings (e.g., 509, 528) in the encapsulating wafer are not created, thereby limiting the affect of the TEV upon the stationary plate. A combination of these methods or other techniques may be employed to limit the movement of the stationary plate along the z-axis 502.

Method for Utilizing FBAR for Detecting Changes in Environmental Variables

Figure 6:
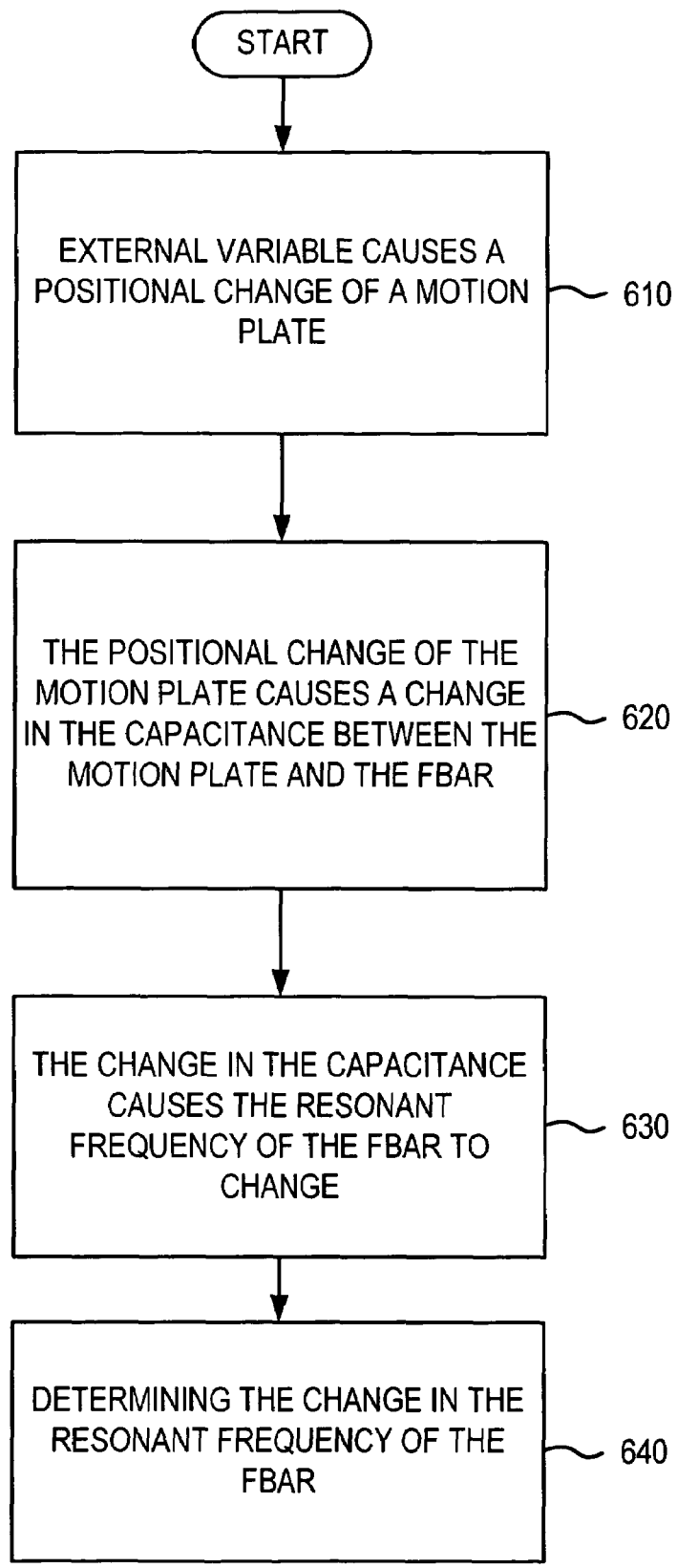
FIG. 6 is a flowchart illustrating a method for detecting an environmental variable by utilizing at least one FBAR and a motion plate according to one embodiment of the invention.

FIG. 6 is a flowchart illustrating a method for detecting an environmental variable by utilizing at least one FBAR and a motion plate according to one embodiment of the invention. The method according to the one embodiment of the invention utilizes one or more FBARs to measure or detect changes in one or more environmental variables or factors. In step 610, an external variable causes a positional change of a motion plate. For example, a change in the pressure or acceleration causes a displacement in the motion plate. In step 620, the positional change of the motion plate causes a change in the capacitance between the motion plate and the FBAR.

In step 630, the change in the capacitance causes the resonant frequency of the FBAR to change. In step 640, the change in the resonant frequency of the FBAR is determined (e.g., measured). For example, the change in the resonant frequency of the FBAR may be employed to represent or indicate a change in the external variable (e.g., pressure, vibrometer, acceleration, and microphone).

Figure 7:
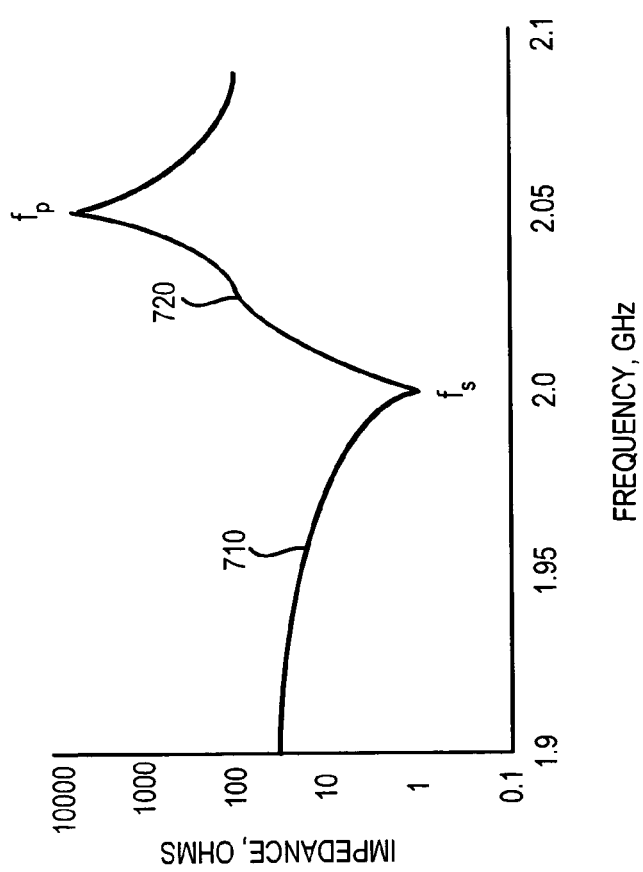
FIG. 7 is an impedance versus frequency graph that illustrates two waveforms and the effect of a motion plate on the resonant frequency of an FBAR according to one embodiment of the invention.

FIG. 7 is an impedance versus frequency graph that illustrates the frequency response of the FBAR, the series resonant frequency ($f_s$) and the parallel resonant frequency ($f_p$) according to one embodiment of the invention. FIG. 7 illustrates two different waveforms that appear superimposed on each other due to the scale assigned to the x axis and the y axis. The first waveform 710 is generated when the motion plate is in an initial position with respect to the FBAR. The second waveform 720 is generated when the motion plate is in a "moved" or displaced position with respect to the FBAR due to a target environmental variable.

It is noted that the lower resonant frequency of the FBAR, which is referred to as the "series resonant frequency" ($f_s$) of the FBAR, is not significantly affected by the motion plate displacement when the motion plate is electrically connected as shown in FIG. 9. The series resonant frequency ($f_s$) that is denoted by the label "$f_s$," is approximately 2 GHz. However, the higher resonant frequency of the FBAR, which is referred to as the "parallel resonant frequency" is affected or shifted to the left when the motion plate is moved or displaced with respect to the FBAR. An expanded portion of the first and second waveforms near the parallel resonant frequency is illustrated in FIG. 8 in order to show a frequency shift in the parallel resonant frequency of about 1 MHz between the first waveform and the second waveform.

Figure 8:
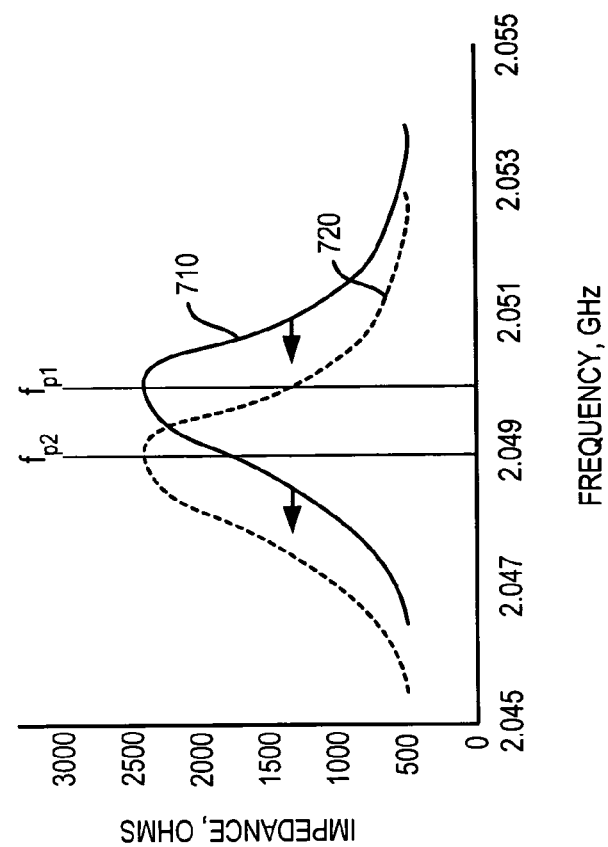
FIG. 8 illustrates in greater detail a portion of the waveforms of FIG. 7 according to one embodiment of the invention.

FIG. 8 is an impedance versus frequency graph that illustrates in greater detail a portion of FIG. 7 and the effect of a motion plate on the parallel resonant frequency of the FBAR according to one embodiment of the invention. The solid curve illustrates the first graph 710 of the impedance versus frequency (e.g., an initial graph). The second graph (dotted curve) 720 illustrates a second graph of the impedance versus frequency (e.g., a subsequent graph) as an external capacitance caused by movement of the motion plate increases. The first graph 710 is shifted to the left to become the second graph 720. The parallel resonant frequency ($f_p$) of the first graph 710 is approximately 2.05 GHz. The parallel resonant frequency ($f_p$) of the second graph 720 is approximately 2.049 GHz, which is about a 1 MHz frequency shift. For example, a change in the impedance (e.g., an increase in the external capacitance C_ext) causes the resonance frequency to change or shift. Exemplary circuit representations of the FBAR with motion plate are illustrated in FIGS. 9 and 10.

It is noted that the FBAR and motion plate can be configured to affect or cause only the series resonant frequency to change, only the parallel resonant frequency to change (as in FIG. 7 and 8), or both the series resonant frequency and the parallel resonant frequency to change.

FIG. 9 illustrates a first circuit representation of a FBAR with a motion plate according to one embodiment of the invention. The FBAR is typically represented by an internal capacitor (C_int) in parallel with a branch that includes an inductor (L), capacitor (C), and resistor (R) in series. The external capacitor (C_ext) represents the capacitance that is due to the motion plate. In this embodiment, the external capacitor is disposed in parallel to the internal capacitance (C_ext).

FIG. 10 illustrates a second circuit representation of a FBAR with a motion plate according to another embodiment of the invention. The FBAR is typically represented by an internal capacitor (C_int) in parallel with a branch that includes an inductor (L), capacitor (C), and resistor (R) in series. The external capacitor (C_ext) represents the capacitance that is due to the motion plate. In this embodiment, the external capacitor is in series to the internal capacitance (C_ext).

According to another embodiment of the measuring apparatus, the TEV detection device that employs one or more FBARs with a motion plate also includes a low power radio. It is noted that the FBAR with motion plate may be implemented with the same fabrication process that a low power transmitter (e.g., a radio). Integrating a low power radio with the FBAR with motion plate enables the TEV detection apparatus to be remotely queried by a querying device. In response, the TEV detection apparatus can transmit the detected frequency shift to the querying device. Since the FBAR radio is relatively compact and the TEV detection apparatus that utilizes the FBAR with motion plate is also relatively compact, the overall package for the radio and the TEV detection apparatus device according to the invention is also relatively compact.

An apparatus and method that detects a target environmental variable (TEV) by employing a FBAR with motion plate according to the invention may be implemented in a variety of different consumer, industrial, and military applications where precise and reliable measurement of an environmental variable is required. These applications include, but are not limited to, automotive airbag and safety applications, automotive security applications, motion detection applications, electronic braking systems, precision navigation systems, stability compensation for industrial equipment, physiological monitoring (e.g., medical instrumentation and diagnostic equipment), and stabilization/tilt correction applications.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. A method for utilizing a film-bulk acoustic resonator with a motion plate to detect a change in a target environmental variable, the method comprising:
   providing a film-bulk acoustic resonator (FBAR) on a first wafer, said FBAR comprising at least one resonant property;
   providing the motion plate spaced from the FBAR such that a capacitive connection is formed between the motion plate and the FBAR and such that changes in the capacitance between the motion plate and the FBAR cause a change in the resonant property of the FBAR; and
   detecting a change in the target environmental variable by employing the FBAR and motion plate to detect a change in the resonant property of the FBAR.

2. The method of claim 1 further including:
   providing a second film-bulk acoustic resonator (FBAR) comprising at least one resonant property on the first wafer;
   providing a stationary plate spaced from said second FBAR;
   employing the first FBAR and the second FBAR to measure a change in the resonant property of the second FBAR.

3. The method of claim 2 wherein:
   the stationary plate is capacitively coupled to the second film-bulk acoustic resonator; and
   wherein changes in the capacitance between the stationary plate and the second FBAR cause a change in the resonant property of the second FBAR; and
   detecting a change in one of pressure, acceleration, and other environmental variable by employing the second FBAR and the stationary plate to measure a change in the resonant property of the second FBAR.

4. The method of claim 2 wherein physical displacement of the motion plate can be detected by one of measuring the beat frequency of the first FBAR and the second FBAR and mixing a signal at the resonant frequency of the first FBAR with a signal at the resonant frequency of the second FBAR.

5. The method of claim 1 wherein the motion plate is one of coupled in parallel with the film-bulk acoustic resonator and in series with the film-bulk acoustic resonator.

6. The method of claim 1 wherein the motion plate one of moves along a first axis that is substantially parallel to the plane of the film-bulk acoustic resonator, moves along a second axis that is substantially perpendicular to the plane of the film-bulk acoustic resonator, and rotates about a third axis.

7. The method of claim 1 wherein the motion plate is one of disposed at a predetermined distance from the film-bulk acoustic resonator and disposed at a predetermined distance from a conductive pad that is electrically coupled to the top electrode of the film-bulk acoustic resonator.

8. A target environmental variable detection apparatus comprising:
   a first film-bulk acoustic resonator (FBAR) that includes a FBAR wafer;
   an acoustic reflector formed in the FBAR wafer that includes a surface;
   a first electrode formed on the surface of the acoustic reflector;
   wherein the first electrode includes a surface;
   a piezoelectric layer formed on the surface of the first electrode;
   wherein the piezoelectric layer includes a surface;
   a second electrode formed on the surface of the piezoelectric layer; and
   a motion plate spaced from the first FBAR;
   wherein the motion plate is capacitively coupled to the first FBAR.

9. The apparatus of claim 8 wherein the motion plate is one of coupled in parallel with the first film-bulk acoustic resonator and in series with the first film-bulk acoustic resonator.

10. The apparatus of claim 8 wherein the motion plate one of moves along a first axis that is substantially parallel to the plane of the first film-bulk acoustic resonator, moves along a second axis that is substantially perpendicular to the plane of the first film-bulk acoustic resonator, and rotates about a third axis.

11. The apparatus of claim 8 wherein the motion plate is one of disposed at a predetermined distance from the first film-bulk acoustic resonator and disposed at a predetermined distance from a conductive pad that is electrically coupled to a top electrode of the first film-bulk acoustic resonator.

12. The apparatus of claim 8 wherein the acoustic reflector is one of an air gap and an acoustic Bragg reflector; wherein the apparatus further comprises a support structure that couples the motion plate to the FBAR wafer.

13. The apparatus of claim 8 further comprising:
   a microcap wafer that encapsulates the first FBAR; and
   a support structure that couples the motion plate to the microcap wafer.

14. The apparatus of claim 8 further comprising:
a second acoustic reflector formed in the FBAR wafer that includes a surface;
a third electrode formed on the surface of the second acoustic reflector;
wherein the third electrode includes a surface;
a second piezoelectric layer formed on the surface of the third electrode;
wherein the second piezoelectric layer includes a surface;
a fourth electrode formed on the surface of the second piezoelectric layer.

15. The apparatus of claim 14 further comprising:
a stationary plate spaced from and capacitively coupled to the second FBAR;
wherein the stationary plate moves along at least one less axis of motion than the motion plate.

16. The apparatus of claim 15 wherein the stationary plate is one of coupled in parallel with the second film-bulk acoustic resonator and in series with the second film-bulk acoustic resonator.

17. The apparatus of claim 15 wherein the stationary plate is one of disposed at a predetermined distance from the first film-bulk acoustic resonator and disposed at a predetermined distance from a conductive pad that is electrically coupled to a top electrode of the second film-bulk acoustic resonator.

18. The apparatus of claim 8 wherein the first FBAR includes a resonant frequency, a quality factor, and a resonant property; and
wherein changes in the capacitance between the motion plate and the first FBAR cause a change in one of the resonant frequency, the quality factor, and the resonant property of the first FBAR.

19. The apparatus of claim 8 wherein the apparatus is implemented as one of a pressure sensor, microphone, accelerometer and vibrometer.

* * * * *